United States Patent [19]
Rebhan

[11] Patent Number: 5,432,244
[45] Date of Patent: Jul. 11, 1995

[54] PROCESS FOR THE PRODUCTION OF POLYPROPYLENE

[75] Inventor: David M. Rebhan, Charleston, W. Va.

[73] Assignee: Union Carbide Chemicals & Plastics Technology Corporation, Danbury, Conn.

[21] Appl. No.: 626,523

[22] Filed: Dec. 12, 1990

[51] Int. Cl.⁶ .................... C08F 4/651; C08F 4/654; C08F 10/06
[52] U.S. Cl. .................... 526/125; 502/125; 502/127; 526/351
[58] Field of Search .......................... 526/125

[56] References Cited

U.S. PATENT DOCUMENTS

| | | | |
|---|---|---|---|
| 4,069,169 | 1/1978 | Toyota et al. | 526/125 |
| 4,234,710 | 11/1980 | Moberly et al. | 526/125 |
| 4,329,253 | 5/1982 | Goodall et al. | 526/125 |
| 4,414,132 | 11/1983 | Goodall et al. | 526/125 |
| 4,563,512 | 1/1986 | Goodall | 526/125 |

FOREIGN PATENT DOCUMENTS 64602  4/1984  Japan.
203105  9/1986  Japan.

*Primary Examiner*—Edward J. Smith
*Attorney, Agent, or Firm*—Saul R. Bresch

[57] ABSTRACT

A process for the polymerization of propylene or a mixture comprising propylene and one or more alpha-olefins and, optionally, one or more diolefins comprising contacting the propylene or the mixture of olefins in at least one reaction zone, under polymerization conditions, with a catalyst system comprising (i) a solid catalyst precursor, which includes magnesium; titanium; a halogen which is chlorine, bromine, or iodine, or mixtures thereof; and a mono- or polycarboxylic acid ester; (ii) a hydrocarbylaluminum cocatalyst; and (iii) a mixture of selectivity control agents comprising a mono- or polycarboxylic acid ester and a silicon compound containing at least one silicon-oxygen-carbon linkage with the proviso that (a) the atomic ratio of aluminum to titanium is in the range of about 5 to about 300; and (b) the molar ratio of the ester to silicon compound in the mixture of selectivity control agents is at least about 1.5:1.

11 Claims, No Drawings

PROCESS FOR THE PRODUCTION OF POLYPROPYLENE

TECHNICAL FIELD

This invention relates to a process for the production of polypropylene with a variation of a catalyst system adapted for such a polymerization comprising a solid titanium-based catalyst containing an inside electron donor, a hydrocarbyl aluminum cocatalyst, and a selectivity control agent.

BACKGROUND INFORMATION

For catalyst systems of the type described above, there exist two basic relationships by which much of their chemistry can be explained, i.e., (i) catalyst productivity vs. the aluminum/titanium atomic ratio and (ii) catalyst productivity vs. selectivity (as measured by percent xylene solubles). The catalyst productivity increases precipitously as the aluminum/titanium atomic ratio increases up to 35:1 to 40:1. Above this ratio, productivity increases much more slowly. This region is referred to as the productivity plateau. Normal operating procedure is to add just enough hydrocarbyl aluminum compound to reach the productivity plateau, i.e., 40:1. At this concentration, productivity is maximized and residual catalyst components in the resin are minimized. With regard to selectivity, adding more selectivity control agent causes one to move towards lower xylene solubles and lower catalyst productivity. Adding less selectivity control agent causes one to move towards higher xylene solubles and higher catalyst productivity. As the xylene solubles decrease from higher values toward lower ones, catalyst productivity decreases slowly. As the xylene solubles decrease even more, there is a point at which catalyst productivity falls off dramatically. In this region, control of the reaction is difficult and catalyst productivity very quickly becomes unacceptable. The maximum productivity and minimum xylene solubles (or maximum isotacticity) of a catalyst system, then, is defined by these relationships.

Thus, one of the problems faced by workers in this field is to make improvements in the maximum productivity and isotacticity obtainable for a given catalyst system. Furthermore, it is desirable to increase catalyst productivity over the range of normal xylene solubles operation.

DISCLOSURE OF THE INVENTION

An object of this invention, therefore, is to provide a process for the production of polypropylene in which productivity and isotacticity are maximized, and the lower xylene solubles limit is extended.

Other objects and advantages will become apparent hereinafter.

The above object is met by a process for the polymerization of propylene or a mixture comprising propylene and one or more alpha-olefins and, optionally, one or more diolefins comprising contacting propylene or the mixture of olefins in the liquid phase or the gas phase in at least one reaction zone, under polymerization conditions, with a catalyst system comprising (i) a solid catalyst precursor, which includes magnesium; titanium; a halogen which is chlorine, bromine, or iodine, or mixtures thereof; and a mono- or polycarboxylic acid ester; (ii) a hydrocarbylaluminum cocatalyst; and (iii) a mixture of selectivity control agents comprising a mono- or polycarboxylic acid ester and a silicon compound containing at least one silicon-oxygen-carbon linkage with the proviso that (a) the atomic ratio of aluminum to titanium is in the range of about 5 to about 300; and (b) the molar ratio of the ester to silicon compound in the mixture of selectivity control agents is at least about 1.5:1.

DESCRIPTION OF THE PREFERRED EMBODIMENT(S)

The catalyst system is made up of a solid catalyst precursor, which includes magnesium, titanium, a halogen, e.g., chlorine, and an electron donor; an organoaluminum compound, which can be referred to as a cocatalyst; and a mixture of selectivity control agents. A selectivity control agent is defined as an additive, which modifies the catalyst precursor in such a manner as to increase the overall percentage of isotactic crystalline polymer produced.

Descriptions of solid catalyst precursors of this type can be found in U.S. Pat. Nos. 4,414,132; 4,535,068; and 4,657,995. In these cases, the solid catalyst precursor is obtained by halogenating a magnesium compound having the formula $MgR_{2-n}X_n$ wherein R is an alkoxide or an aryloxide group, each R being the same or different, X is a halogen (chlorine, benzene, or iodine), and n=0 or 1 with a tetravalent titanium halide in the presence of a halohydrocarbon and an electron donor; contacting the halogenated product with a tetravalent titanium halide; optionally treating the resulting solid with an aromatic acid halide; washing the halogenated product to remove unreacted titanium compounds; and recovering the solid product.

The atomic or molar ratios of catalyst components can be about as follows:

| Ratio | Broad Range | Preferred Range |
| --- | --- | --- |
| Mg to Ti | 1:1 to 50:1 | 3:1 to 30:1 |
| Cl to Mg | 1:1 to 5:1 | 2:1 to 3:1 |
| Mg to inside electron donor | 0.1:1 to 100:1 | 1:1 to 60:1 |
| Al to Ti | 5:1 to 300:1 | 10:1 to 200:1 |
| Al to total selectivity control agent (SCA) | 0.5:1 to 5:1 | 1:1 to 3:1 |
| SCA ester to SCA silicon | 1.5 to 50:1 | 2.1 to 20:1 |

Suitable halogen containing magnesium compounds that can be used to prepare the catalyst precursor are alkoxy and aryloxy magnesium halides such as isobutoxy magnesium chloride, ethoxy magnesium bromide, phenoxy magnesium iodide, cumyloxy magnesium bromide, and naphthenoxy magnesium chloride.

Magnesium compounds which can be used are magnesium dialkoxides, diaryloxides, and carboxylates having 2 to 24 carbon atoms such as magnesium di-isopropoxide, magnesium diethoxide, magnesium dibutoxide, magnesium diphenoxide, magnesium dinaphthenoxide, and ethoxy magnesium isobutoxide, magnesium dioctanoate, and magnesium dipropionate.

Magnesium compounds having one alkoxide and aryloxide group can also be employed. Examples of such compounds are ethoxy magnesium phenoxide and napthenoxide magnesium isoamyloxide. Also suitable are compounds having one carboxylate group and one alkoxide, aryloxide, or halide group such as ethoxy magnesium octanoate, phenoxy magnesium proionate, and chloromagnesium dodecanoate.

Suitable halides of tetravalent titanium include aryloxy- or alkoxy di- and -trihalides, such as dihexoxy titanium dichloride, diethoxy titanium dibromide, isopropoxy titanium triiodide, and phenoxy titanium trichloride. Titanium tetrahalides, such as titanium tetrachloride, are preferred.

The halohydrocarbons employed can be aromatic or aliphatic. Each aliphatic halohydrocarbon preferably contains from 1 to 12 carbon atoms and at least 2 halogen atoms. The aliphatic halohydrocarbons include dibromomethane, trichloromethane, 1,2-dichloroethane, dichlorobutane, 1,1,3-trichloroethane, trichlorocyclohexane, dichlorofluoroethane, trichloropropane, trichlorofluoroethane, trichloropropane, trichlorofluorooctane, dibromodifluorodecane, hexachloroethane, and tetrachloroisooctane. Carbon tetrachloride and 1,1,3-trichloroethane are preferred. Aliphatic halohydrocarbons containing only one halogen atom per molecule, such as butyl chloride and amyl chloride, can also be employed. Suitable aromatic halohydrocarbons include chlorobenzene, bromobenzene, dichlorobenzene, dichlorodibromobenzene, naphthyl chloride, chlorotoluene, and dichlorotoluene. Chlorobenzene is the most preferred halohydrocarbon.

Examples of the monocarboxylic acid ester, which can be used in the Mg/Ti complex as the inside electron donor and as a selectivity control agent (outside electron donor), are as follows: ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate and propyl pivalate.

Suitable polycarboxylic acid esters, which can be used as the inside electron donor or as a selectivity control agent, can be characterized by a molecularly rigid structure wherein two ester groups are attached to adjacent carbon atoms of the molecule and lie in a single plane. Such esters include polycarboxylic acid esters containing two ester groups which are attached to (a) ortho carbon atoms of a monocyclic or polycyclic aromatic ring, each of said ester groups being further linked to a branched or unbranched chain hydrocarbon radical; (b) vicinal carbon atoms of a non-aromatic monocyclic or polycyclic ring and which lie in a syn configuration with respect to each other, each of said ester groups being further linked to a branched or unbranched chain hydrocarbon radical; or (c) vicinal double bonded carbon atoms of an unsaturated aliphatic compound and which lie in a syn configuration with respect to each other, each of said ester groups being further linked to a branched or unbranched chain hydrocarbon radical.

These polycarboxylic acid esters are derived from a suitable polycarboxylic acid and a monohydric alcohol having a linear hydrocarbon moiety which can be branched or unbranched. Examples of polycarboxylic acid esters are dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl-1,2-fluorenedicarboxylate, diisopropyl-1-,2-ferrocenedicarboxylate, cis-diisobutyl-cyclobutane-1, 2dicarboxylate, endo-diisobutyl-5-norbornene-2,3-dicarboxylate, and endo-diisobutylbicyclo[2.2.-2]oct-5-ene-2,3-dicarboxylate, diisobutyl maleate, and diisoamyl citraconate.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnapthyl, cyclohexyl, cycloheptyl, and cyclooctyl.

Examples of suitable hydrocarbyl aluminum compounds are as follows: Triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, di-isobutylaluminum hydride, and dihexylaluminum hydride.

As noted, a mixture of selectivity control agents is used in the process of this invention. One of the selectivity control agents is the mono- or polycarboxylic acid ester described above. The other selectivity control agent is a silicon compound containing at least one silicon-oxygen-carbon linkage. The silicon compounds include compounds having the formula $R_aSiY_bX_c$ wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and $a+b+c=4$. R can be substituted or unsubstituted. Silicon compounds containing Si—O—Si groups can also be employed provided that at least one Si—O—C group is present. Examples of useful silicon compounds are diphenyldimethoxysilane, n-propyltrimethoxysilane, di-tert-butyldimethoxysilane, diphenyldiisobutoxysilane, diisobutyldimethoxysilane, dimethyldiethoxysilane, ethyltriethoxysilane, tetraethoxysilane, diethyldiethoxysilane, cyclohexylmethyldimethoxysilane, cyclohexyltrimethoxysilane, and t-butyltrimethoxysilane.

It is understood that more than one of each component of the described catalyst system can be used, if desired. Unhindered inside electron donors and selectivity control agents are preferred.

The molar ratio of the components of the selectivity control agent mixture is very important to the process of the invention. As noted above, the molar ratio of carboxylic acid ester to silicon compound should, therefore, be at least about 1.5:1. The preferred molar ratio is about 2:1 to about 20:1. It should be noted, however, that within the aforementioned ranges, the optimum molar ratio changes with the components used.

The acid halide mentioned above is the compound corresponding to the ester compound used as the inside electron donor. Preferably, the halide is a chloride or bromide. The acid halide can contain 7 to 22 carbon atoms and one or more aromatic rings.

A modifier can be used in the catalyst system, if desired. The modifier has the formula $BX_3$ or $AlR_{(3-a)}X_a$ wherein X is chlorine, bromine, or iodine; R is an alkyl radical having 1 to 14 carbon atoms; each X and R are the same or different; and a is 0, 1, or 2. Preferred modifiers include alkylaluminum mono- and di- chlorides wherein each alkyl radical has 1 to 6 carbon atoms, and boron trichloride. A particularly preferred modifier is diethyl aluminum chloride. About 0.1 to about 10 moles, and preferably about 0.2 to about 2.5 moles, of modifier are used per mole of inside electron donor. When the modifier is used it is considered to be part of the titanium complex.

It has been mentioned that the subject process can be carried out in the gas phase or the liquid phase. A homopolymer of propylene, or a copolymer of propylene based on two or more comonomers, can be prepared in either manner. In addition to the propylene, the comonomers can be alpha-olefins having 2 or 4 to 12 carbon atoms or conjugated or non-conjugated dienes containing 4 to 25 carbon atoms. Useful alpha-olefins preferably do not contain any branching on carbon atoms closer than two carbon atoms removed from the double bond. Examples of suitable alpha-olefins include ethylene, 1-butene, 1-hexene, 4-methylpantene-1, 1-heptene, and 1-octene. Examples of the dienes are 1,4-pentadiene, 1,4-hexadiene, 1,5-hexadiene, dicyclopentadiene, cyclohexadiene, 1-vinyl-1-cyclopentene, and the alkyl-bicyclononadienes, indenes, and norbornenes. Ethylidene norbornene is an examples of the latter. The non-conjugated dienes are preferred.

In the copolymer, the portion based on propylene can be in the range of about 40 to about 99 percent by weight based on the weight of the copolymer and is preferably in the range of about 50 to about 95 percent by weight; the portion based on the second comonomer, usually an alpha-olefin, can be in the range of about 1 to about 60 percent by weight based on the weight of the copolymer and is preferably in the range of about 5 to about 50 percent by weight; and the portion based on additional comonomers, alpha-olefins and/or dienes, if any, can be in the range of about 1 to about 20 percent by weight based on the weight of the copolymer and is preferably in the range of about 1 to about 10 percent by weight. In addition to copolymers based on two or three comonomers, copolymers having four or more comonomers are contemplated.

With regard to the gas phase, the polymers can be prepared in one or more fluidized bed reactors such as that described in U.S. Pat. No. 4,482,687 or in other conventional gas phase reactors.

The fluidized bed, or other gas phase, reactor can be operated at a temperature in the range of about 50° C. to about 150° C. and is preferably operated at a temperature in the range of about 60° C. to about 90° C. The operating pressure is in the range of about 200 psig to about 650 psig or higher and preferably about 250 psig to about 550 psig. The partial pressure of the propylene can be in the range of about 50 to about 600 psi and is preferably about 150 to about 500 psi. The total partial pressure of other comonomers can be about 1 to about 250 psi.

The residence time of the olefin(s) in the reactor can be in the range of about 1 to about 20 hours and is preferably about 2 to about 6 hours. The velocity of the fluidizing gas can be in the range of abut 0.1 to about 5.0 feet per second or higher and is preferably about 0.5 to about 2.0 feet per second. Hydrogen or another chain transfer agent can be used in the process. The molar ratio of hydrogen to propylene when used in the fluidized bed reactor can be in the range of about 0.0005:1 to about 0.2:1 and is preferably in the range of about 0.01:1 to about 0.1:1. This translates into a hydrogen partial pressure in the range of about 0.5 psi to about 50 psi. The balance of the operating pressure utilized in the reactor, i.e., after the partial pressure of propylene, other comonomers, if any, and the hydrogen partial pressure are considered, can be made up by using an inert gas such as nitrogen.

A typical liquid phase process can be described as follows: Normal operating temperatures are in the range of about 10° C. to about 80° C. and the liquid phase process is preferably operated at a temperature in the range of about 40° C. to about 70° C. The operating pressure is determined by the vapor pressure of propylene at the operating temperature. The molar ratio of other comonomers to propylene can be about 1:99 to about 1.5:1.

The residence time of the olefin(s) in the reactor can be in the range of about 0.5 to about 20 hours, and is preferably about 1 to about 4 hours. Hydrogen or other chain transfer agents can be used in the process. The concentration of hydrogen in the liquid slurry is governed by the solubility of hydrogen in the liquid.

The advantages of the process of the invention are low residual amount, e.g., of para-ethoxy ethyl benzoate in the resin, .thus reducing its odor; higher productivity resulting in reduced ash levels and lower xylene solubles, i.e., higher isotacticity. The invention allows for enlargement of the practical process operating region, i.e., the lower xylene solubles limit is extended.

The patents mentioned in this specification are incorporated by reference herein.

The invention is illustrated by the following examples.

EXAMPLES 1 TO 17

A prepared solid catalyst precursor having the following approximate composition:

$TiCl_4 \cdot 12\ MgCl_2 \cdot 2\ C_6H_5COOC_6H_5$, premixed in a mix tank, is continuously fed into a fluidized bed reactor as a 30 percent by weight dispersion in mineral oil. Simultaneously, and continuously, triethylaluminum cocatalyst (TEAL) as a solution in isopentane; para-ethoxy ethyl benzoate (PEEB) as a solution in isopentane; and diisobutyldimethoxysilane (DIBDMS) as a 1.0 percent by weight solution in isopentane are also added to the reactor.

Sufficient solid catalyst component, cocatalyst, and selectivity control agents (PEEB and DIBDMS) are introduced into the reactor to maintain the molar ratio of aluminum to total selectivity control agent (SCA); TEAL to titanium; and of PEEB to DIBDMS.

Propylene, hydrogen, and nitrogen are added to maintain a specified total pressure. The total pressure and partial pressure of propylene are mentioned in the Table as well as the hydrogen/propylene molar ratio. The balance of the total pressure is made up with nitrogen. The catalyst feed is accomplished through the use of a syringe continuous feeder. The average residence time, based on titanium analysis of the polypropylene resin, is 2.5 hours. The resin product is transferred from the fluidized bed to a receiving drum continuously purged with humidified nitrogen so that the contained moisture can deactivate the catalyst components in the resin to reduce odor.

The reactor is a pilot scale model, 14 inches in diameter and 28 feet in height. It is operated in the condensing mode. Condensing mode operation is described in United States patents 4,543,399 and 4,588,790 wherein the recycle gas stream is cooled to a temperature at or below the dew point of the recycle gas stream to produce a two-phase gas/liquid mixture under conditions such that the liquid phase of said mixture will remain entrained at least from the point of entry until it passes into the fluidized bed.

In order to compare the observed productivities, the results are normalized to an average residence time of 3 hours using an experimentally determined catalyst decay constant. The results are also normalized to 360 psi propylene by assuming that the polymerization is first order in propylene. Furthermore, the observed productivities are normalized to a constant xylene soluble level. Productivities normalized in this way can be used to show productivity increases as a function of SCA composition.

Variable conditions and results are set forth in Table I.

EXAMPLES 18 TO 22

Example 1 is repeated except that 0.5 weight percent normal-propyltrimethoxysilane (NPTMS) is substituted for the DIBDMS.

Variable conditions and results are set forth in Table II.

EXAMPLES 23 TO 27

Example 1 is repeated except that 2 weight percent ethyltriethoxysilane (ETES) is substituted for the DIBDMS.

Variable conditions and results are set forth in Table III.

TABLE I

| | Example | | | | | | | | |
|---|---|---|---|---|---|---|---|---|---|
| | 1 | 2 | 3 | 4 | 5 | 6 | 7 | 8 | 9 |
| reactor pressure (psig) | 415 | 424 | 425 | 425 | 425 | 424 | 426 | 426 | 426 |
| reactor temperature (°C.) | 65 | 65 | 65 | 65 | 65 | 65 | 65 | 65 | 65 |
| $H_2/C_3$ molar ratio | 0.028 | 0.0302 | 0.0244 | 0.0197 | 0.0165 | 0.016 | 0.0159 | 0.017 | 0.0178 |
| resin production rate (lbs/hr) | 49.6 | 27.7 | 32 | 35.2 | 33.4 | 33.2 | 32.6 | 20.5 | 24.5 |
| recycle gas velocity (ft/sec) | 0.8 | 1.1 | 1.1 | 1 | 1 | 1 | 1 | 1 | 1 |
| propylene partial pressure (psig) | 346 | 355 | 360 | 359 | 368 | 365 | 363 | 362 | 366 |
| 2.5 eight % TEAL/i-pentane rate (cc/hr) | 966 | 1008 | 986 | 347 | 350 | 354 | 367.1 | 373 | 357 |
| 1 weight % DIBDMS/i-pentane rate (cc/hr) | 0 | 425 | 568 | 0 | 190.2 | 186.5 | 197.4 | 225 | 208.5 |
| 2.5 weight % PEEB/i-pentane rate (cc/hr) | 836 | 690 | 634 | 302 | 210 | 219 | 246.7 | 254 | 259.5 |
| resin bed eight (lbs) | 80 | 80 | 80 | 80 | 80 | 80 | 80 | 80 | 80 |
| Al/Ti molar ratio | 63.36 | 129.27 | 136.75 | 33.67 | 48.87 | 53.50 | 43.69 | 41.37 | 35.39 |
| TEAL/(PEEB + DIBDMS) molar ratio | 1.96 | 2.01 | 1.97 | 1.95 | 2.11 | 2.08 | 1.94 | 1.87 | 1.79 |
| PEEB/Total SCA molar ratio | 1 | 0.81 | 0.75 | 1.00 | 0.74 | 0.76 | 0.77 | 0.75 | 0.77 |
| PEEB/DIBDMS molar ratio | 0 | 4.27 | 2.94 | 0 | 2.90 | 3.09 | 3.29 | 2.97 | 3.27 |
| Results | | | | | | | | | |
| catalyst productivity | 10.79 | 13.19 | 12.41 | 9.15 | 11.61 | 12.18 | 12.15 | 11.38 | 11.64 |
| melt flow | 1.4 | 1.8 | 1.8 | 1.7 | 2.33 | 2.18 | 1.55 | 0.7 | 0.62 |
| Ti (ppm) | 4.44 | 3.52 | 3.76 | 4.26 | 3.12 | 2.9 | 3.75 | 6.4 | 5.99 |
| xylene solubles (%) | 2.22 | 1.7 | 1.8 | 2.65 | 2.37 | 2.36 | 1.88 | 1.37 | 1.36 |
| ash (weight %) | 0.029 | 0.059 | 0.068 | 0.013 | 0.017 | 0.015 | 0.022 | 0.035 | 0.028 |
| settled bulk density (lb/cu ft) | 19.15 | 18.28 | 18.4 | 19.74 | 20.47 | 20.3 | 21.35 | 19.88 | 19.9 |
| normalized Ti (ppm) ($\phi = 3hrs$) | 3.88 | 3.39 | 3.74 | 4.09 | 3.10 | 2.86 | 3.68 | 6.62 | 6.15 |

| | Example | | | | | | | |
|---|---|---|---|---|---|---|---|---|
| | 10 | 11 | 12 | 13 | 14 | 15 | 16 | 17 |
| reactor pressure (psig) | 425 | 424 | 424.5 | 425 | 426 | 425 | 425 | 426 |
| reactor temperature (°C.) | 65 | 65 | 65 | 65 | 65 | 65 | 65 | 65 |
| $H_2/C_3$ molar ratio | 0.0211 | 0.0157 | 0.0141 | 0.0126 | 0.0117 | 0.0138 | 0.0128 | 0.0129 |
| resin production rate (lbs/hr) | 18.6 | 36.3 | 34.1 | 36.2 | 34.2 | 21.3 | 30.8 | 30.8 |
| recycle gas velocity (ft/sec) | 1 | 1 | 1 | 1 | 1 | 1 | 1 | 1 |
| propylene partial pressure (psig) | 363.5 | 363.5 | 351 | 359 | 361 | 361 | 367 | 369 |
| 2.5 weight % TEAL/i-pentane rate (cc/hr) | 366 | 362.4 | 400 | 369.4 | 371 | 344 | 376.5 | 367 |
| 1 weight % DIBDMS/i-pentane rate (cc/hr) | 226.5 | 301 | 437 | 169.6 | 190 | 0 | 457 | 451 |
| 2.5 weight % PEEB/i-pentane rate (cc/hr) | 265.4 | 193 | 192 | 191.2 | 182 | 267 | 212 | 159 |
| resin bed weight (lbs) | 80 | 80 | 80 | 80 | 80 | 80 | 80 | 80 |
| Al/Ti molar ratio | 40.04 | 52.44 | 58.25 | 72.43 | 78.92 | 67.14 | 50.67 | 49.96 |
| TEAL/(PEEB + DIBDMS) molar ratio | 1.77 | 2.01 | 1.90 | 2.46 | 2.48 | 2.19 | 1.66 | 1.69 |
| PEEB/Total SCA molar ratio | 0.76 | 0.63 | 0.54 | 0.75 | 0.72 | 1.00 | 0.55 | 0.54 |
| PEEB/DIBDMS molar ratio | 3.08 | 1.69 | 1.16 | 2.97 | 2.52 | 1.22 | 1.16 | |
| Results | | | | | | | | |
| catalyst productivity | 11.57 | 10.99 | 10.48 | 11.39 | 11.05 | 9.57 | 11.26 | 11.39 |
| melt flow | 0.62 | 3 | 3.96 | 3.16 | 3.15 | 1.33 | 1.77 | 1.88 |
| Ti (ppm) | 7.15 | 2.77 | 2.93 | 2.05 | 2 | 3.5 | 3.51 | 3.47 |
| xylene solubles (%) | 1.2 | 2.88 | 2.97 | 3.62 | 3.76 | 2.73 | 2.24 | 2.22 |
| ash (weight %) | 0.036 | 0.02 | 0.024 | 0.021 | 0.016 | 0.026 | 0.025 | 0.02 |
| settled bulk density (lb/cu ft) | 20.8 | 20.8 | 19.6 | 19.01 | 19.6 | 19.6 | 19.7 | 20.3 |

TABLE I-continued

| | | | | | | | | |
|---|---|---|---|---|---|---|---|---|
| normalized Ti (ppm) ($\phi$ = 3 hrs) | * | 7.49 | 2.68 | 277 | 1.96 | 1.94 | 3.59 | 3.51 | 3.47 |

TABLE II

| | Example | | | | |
|---|---|---|---|---|---|
| | 18 | 19 | 20 | 21 | 22 |
| reactor pressure (psig) | 425 | 399 | 422 | 383 | 391 |
| reactor temperature (°C.) | 65 | 65 | 65 | 65 | 65 |
| H$_2$/C$_3$ molar ratio | 0.0159 | 0.0192 | 0.0179 | 0.0086 | 0.0346 |
| residence time (hrs) | 2.46 | 2.58 | 3.05 | 2.64 | 2.95 |
| recycle gas velocity (ft/sec) | 0.998 | 1.05 | 1 | 1.03 | 0.79 |
| propylene partial pressure (psig) | 364.6 | 373 | 371 | 367 | 369 |
| 5 weight % TEAL/ i-pentane rate (cc/hr) | 91.6 | 91.5 | 107 | 99.7 | 105 |
| catalyst productivity | 6.37 | 7.89 | 11.07 | 6.37 | 6.29 |
| melt flow | 3.83 | 4.8 | 4.8 | 4.2 | 3.52 |
| Ti (ppm) | 1.72 | 1.95 | 2.3 | 2.31 | 3.11 |
| xylene solubles (%) | 5.73 | 4.7 | 3.16 | 4.72 | 3.22 |
| ash (weight %) | 0.006 | 0.028 | 0.016 | 0.016 | 0.018 |
| settled bulk density (lb/cu ft) | 17.11 | 16.38 | 17.98 | 15.64 | 19.01 |
| normalized Ti (ppm) ($\phi$ = 3 hrs) | — | 7.98 | 2.37 | 2.32 | 3.18 |

TABLE III

| Example | 23 | 24 | 25 | 26 | 27 |
|---|---|---|---|---|---|
| reactor pressure (psig) | 401 | 425 | 425 | 425 | 391 |
| reactor temperature (°C.) | 65 | 65 | 65 | 65 | 65 |
| H$_2$/C$_3$ molar ratio | 0.0277 | .03205 | .0328 | .0342 | .0346 |
| residence time (hrs) | 7.7 | 2.32 | 2.9 | 2.95 | 2.95 |
| recycle gas velocity (ft/sec) | 0.7 | 1.0 | 1.0 | 1.11 | 0.79 |
| propylene partial pressure (psig) | 364.3 | 341 | 340 | 339 | 369 |
| 5 weight % TEAL/i-pentane rate (cc/hr) | 116.3 | 279 | 249 | 248 | 105 |
| 2 weight % ETES/i-pentane rate (cc/hr) | 52 | 0 | 31 | 45.25 | 0 |
| 2.5 weight % PEEB/i-pentane rate (cc/hr) | 143 | 452 | 398 | 378 | 184 |
| 0.5 weight % NPTHS/i-pentane rate (cc/hr) | 0 | 54.5 | 66.6 | 99.5 | 0 |
| 2.5 eight % PEEB/ i-pentane rate (cc/hr) | 159.5 | 154 | 190 | 145.9 | 184 |
| resin bed weight (lbs) | 80 | 80 | 80 | 80 | 80 |
| Al/Ti molar ratio | 51.01 | 69 | 58 | 62 | 36 |
| TEAL/(PEEB + ETES) molar ratio | 2.14 | 2.10 | 2.00 | 2.04 | 1.94 |
| PEEB/Total SCA molar ratio | 0.77 | 1.0 | 0.94 | 0.91 | 1.0 |
| PEEB/ETES molar ratio | 3.40 | ∞ | 15.9 | 10.34 | ∞ |
| resin bed eight (lbs) | 80 | 80 | 80 | 80 | 80 |
| Al/Ti molar ratio | 47.31 | 43.72 | 51.24 | 41.15 | 35.97 |
| TEAL/(PEEB + NPTMS) molar ratio | 1.95 | 1.87 | 1.77 | 2.00 | 1.94 |
| PEEB/Total SCA molar ratio | 1.00 | 0.92 | 0.92 | 0.86 | 1.00 |
| PEEB/NPTMS molar ratio | ∞ | 12.00 | 12.11 | 6.23 | ∞ |
| Results | | | | | |
| catalyst productivity | 10.35 | 12.68 | 13.67 | 13.97 | 8.74 |
| melt flow | 5.35 | 2.6 | 3.1 | 3.8 | 3.52 |
| Ti (ppm) | 6.34 | 3.4 | 4.45 | 4.28 | 3.11 |
| xylene solubles (%) | 1.65 | 2.83 | 1.8 | 1.79 | 3.22 |
| ash (weight %) | 0.043 | — | — | — | — |

Notes to Tables:
1. TEAL = triethylaluminum
DIBDMS = diisobutyldimethoxysilane
NPTMS = normal-propyltrimethoxysilane
ETES = ethyltriethoxysilane
PEEB = para-ethoxy ethyl benzoate
SCA = selectivity control agent
2. Examples 1 to 17 use a solution of 2.5 weight % TEAL in isopentane and of 2.5 weight % PEEB in isopentane. Examples 18 to 27 use a solution of 5 weight % TEAL in isopentane and 2.5 weight % PEEB in isopentane.
3. Catalyst productivity is the kilograms of resin produced per gram of catalyst. The productivity is normalized to 3 hours average residence time and 360 psi propylene. The catalyst productivity is further normalized for xylene solubles differences, i.e., it estimates productivity at 4% xylene solubles. The calculation is as follows:

$$\text{Catalyst productivity} = \frac{28}{Ti} + \left[ 12.78 - \left( \frac{32.5}{0.042} + \frac{10}{\%XS} \right) \right]$$

4. Melt flow is determined under ASTM D-1238, Condition L, measured at 230° C. with a 2160 gram load; and reported as grams per 10 minutes.
5. Ti (ppm) = the parts of titanium per million parts of resin. The ppm of titanium are determined by the spectrophotometric method.
6. Xylene solubles are the percent by weight of resin that stays in the solution after the resin sample is dissolved in hot xylene and the solution is allowed to cool to 23° C.
7. Normalized Ti (ppm) is normalized to 3 hours average residence time and 360 psi propylene. It is calculated by assuming that the fluid bed behaves kinetically as a CSTR and that the polymerization kinetics are first order in propylene with a deactivation constant of 2.5 hour$^{-1}$.

EXAMPLES 28 TO 61

These examples are carried out in a liquid phase batch stirred reactor (an autoclave) using propylene as a liquid pool at 67° C. for one hour. The reactor is charged with 2.7 liters of propylene and 132 millimoles of hydrogen and heated to 65° C.

For examples 32 to 62, DEAC (diethylaluminum chloride) is not used. The catalyst components are injected separately and polymerization allowed to proceed at the vapor pressure at 65° C. Triethylaluminum (TEA) cocatalyst is added to give 70 moles of aluminum per mole of titanium. SCA is added to provide a triethylaluminum to total SCA molar ratio of 2:1, i.e., TEA/SCA#1+SCA #2=2.0. The molar ratio of PEEB to DIBDMS is adjusted according to the experimental design.

For examples 29 to 61, DEAC is used as a catalyst modifier. The examples can be split into two groups, one in which the DEAC is premixed with the solid catalyst precursor and another group in which it was not. For the premixed group, solid catalyst precursor and DEAC are premixed 20 minutes before injecting the mixture into the reactor. Also, the TEA, DIBDMS, and PEEB are premixed for 20 minutes and then injected into the reactor. For the non-premixed DEAC group, the solid catalyst precursor, DEAC, TEA, DIBDMS and PEEB are injected separately into the reactor. For both groups, TEA is added to give 70 moles of aluminum per mole of titanium, an SCA is added to give a triethylaluminum to total SCA mole ratio of 2.0.

Variable conditions and results are set forth in Table IV.

A prepared solid catalyst precursor having the following approximate composition:

$TiCl_4$ 12 $MgCl_2$ 2 $C_6H_5COOC_6H_5$, premixed in a mix tank is used as a 5 percent by weight slurry in mineral oil.

TEAL/tetraethoxysilane (TEOS) solutions are prepared at Al/Si mole ratios of 10:1, 7:1, and 4:1 by mixing net TEOS with 25 percent by weight TEAL and then diluting with isooctane to 0.28 mole aluminum content.

DEAC is used as a 1.54 mole solution in heptane.

Each example uses 0.56 millimole TEAL; 0.20 millimole DEAC; 0.008 millimole titanium; 2700 milliliters of propylene; and 128 millimoles of hydrogen. Four different levels of PEEB are used for each AL/Si mole ratio: 0.47, 0.22, 0.14, and 0.089 millimole. The DEAC is premixed with the catalyst precursor prior to injection in the reactor. The injection order is (a) PEEB followed by (b) the TEAL/TEOS mixture followed by (c) the precursor/DEAC mixture.

After the polymerization, the products are dried for two hours under vacuum at about 80° C. Example 67 is carried out using a TEAL/TEOS mixture which stands for a week at room temperature. Example 69 is run for

TABLE IV

| Example | PEEB/DIBDMS (molar ratio) | Catalyst Productivity | Xylene Solubles (% by wt) | Ti (ppm) | DEAC (yes or no) | DEAC premix (yes or no) | TEAL/Total SCA (molar ratio) |
|---|---|---|---|---|---|---|---|
| 28 | ∞ | 26.6 | 3.4 | 1.19 | no | — | 2:1 |
| 29 | ∞ | 22.3 | 3.2 | 1.53 | no | — | 2:1 |
| 30 | ∞ | 23.9 | 3.3 | 1.37 | no | — | 2:1 |
| 31 | ∞ | 24.1 | 3.6 | 1.27 | no | — | 2:1 |
| 32 | 3:1 | 27.4 | 2.6 | 1.37 | no | — | 2:1 |
| 33 | 3:1 | 27.8 | 2.7 | 1.31 | no | — | 2:1 |
| 34 | 3:1 | 29.1 | 3.6 | 1.03 | no | — | 2:1 |
| 35 | 1.5:1 | 27.8 | 3.8 | 1.04 | no | — | 2:1 |
| 36 | 1.5:1 | 28.1 | 4.1 | 0.98 | no | — | 2:1 |
| 37 | 0.67:1 | 22.8 | 4.1 | 1.20 | no | — | 2:1 |
| 38 | 0.67:1 | 23.8 | 4.3 | 1.11 | no | — | 2:1 |
| 39 | ∞ | 34.9 | 4.6 | 0.74 | yes | yes | 2:1 |
| 40 | ∞ | 35 | 4.3 | 0.77 | yes | yes | 2:1 |
| 41 | 3:1 | 31.8 | 3.2 | 1.01 | yes | no | 2:1 |
| 42 | 3:1 | 31 | 3.1 | 1.06 | yes | no | 2:1 |
| 43 | 3:1 | 43.7 | 2.7 | 0.75 | yes | yes | 2:1 |
| 44 | 3:1 | 41.9 | 2.8 | 0.78 | yes | yes | 2:1 |
| 45 | 3:1 | 42 | 2.9 | 0.77 | yes | yes | 2:1 |
| 46 | 1.5:1 | 23 | 4.4 | 1.12 | yes | no | 2:1 |
| 47 | 1.5:1 | 21.5 | 4.6 | 1.14 | yes | no | 2:1 |
| 48 | 1.5:1 | 41.2 | 3.6 | 0.71 | yes | yes | 2:1 |
| 49 | 1.5:1 | 42.4 | 3.1 | 0.74 | yes | yes | 2:1 |
| 50 | 1.5:1 | 35.9 | 4.8 | 0.70 | yes | yes | 2:1 |
| 51 | 1.5:1 | 40 | 4.1 | 0.69 | yes | yes | 2:1 |
| 52 | 0.67:1 | 13.6 | 6.9 | 1 | yes | no | 2:1 |
| 53 | 0.67:1 | 10.3 | 6.7 | 1.18 | yes | no | 2:1 |
| 54 | 0.67:1 | 36.1 | 5.3 | 0.66 | yes | yes | 2:1 |
| 55 | 0.67:1 | 34.5 | 5.2 | 0.69 | yes | yes | 2:1 |
| 56 | 0.67:1 | 33.5 | 5.9 | 0.65 | yes | yes | 2:1 |
| 57 | 0.67:1 | 33.9 | 5.7 | 0.66 | yes | yes | 2:1 |
| 58 | 3:1 | 34 | 2.4 | 1.08 | yes | yes | 1:1 |
| 59 | 3:1 | 42.5 | 2.8 | 0.78 | yes | yes | 2:1 |
| 60 | 3:1 | 40.5 | 5.5 | 0.58 | yes | yes | 3:1 |
| 61 | 3:1 | 26.5 | 8.2 | 0.59 | yes | yes | 4:1 |

Notes to Tables:
8. In examples 28 to 31 and 39 and 40, the PEEB/DIBDMS molar ratio is given as infinity. This is because no DIBDMS is used in these examples.
9. With regard to DEAC (diethylaluminum chloride), the first column advises whether or not DEAC is used in the example and the second column, whether or not the DEAC is premixed with the catalyst for 20 minutes prior to addition of the catalyst precursor to the reactor. The premix is preferred.
10. Catalyst productivity for examples 28 to 61 is calculated as follows:

Catalyst productivity = $\frac{28}{Ti}$ + [4 − %XS) × 5]

EXAMPLES 62 TO 75

These examples (polymerizations) are carried out in a liquid phase batch stirred reactor (an autoclave) using propylene as a liquid pool at 67° C. for one hour.

two hours instead of one hour.

Variable conditions and results are set forth in Table V.

TABLE V

| Example | TEAL/TEOS (mole ratio) | TEAL/PEEB (mole ratio) | PEEB/TEOS (mole ratio) | Catalyst Productivity | Ti (ppm) | Xylene Solubles (%) | Melt Flow | Shear Response |
| --- | --- | --- | --- | --- | --- | --- | --- | --- |
| 62 | 10:1 | 1.2 | 8.33 | 30.1 | 1.07 | 3.2 | 0.85 | 21.1 |
| 63 | 10:1 | 2.5 | 4 | 35.9 | 0.81 | 3.7 | 2.47 | 20.0 |
| 64 | 10:1 | 4.0 | 2.5 | 31.3 | 0.69 | 5.9 | 4.32 | 16.5 |
| 65 | 10:1 | 6.3 | 1.59 | 22.3 | 0.72 | 7.3 | 10.5 | 15.2 |
| 66 | 7:1 | 1.2 | 5.8 | 24.5 | 1.70 | 2.4 | 0.46 | 18.6 |
| 67 | 7:1 | 1.2 | 5.8 | 25.5 | 1.65 | 2.3 | — | — |
| 68 | 7:1 | 2.5 | 2.8 | 34.6 | 0.83 | 3.8 | 5.76 | 16.7 |
| 69 | 7:1 | 2.5 | 2.8 | 44.3 | 0.66 | 3.6 | — | — |
| 70 | 7:1 | 4.0 | 1.75 | 32.9 | 0.78 | 4.6 | 13.8 | 15.6 |
| 71 | 7:1 | 6.3 | 1.11 | 11.6 | 0.92 | 7.8 | 1.4 | 18.3 |
| 72 | 4:1 | 1.2 | 3.3 | 28.9 | 1.31 | 2.5 | 1.24 | 16.4 |
| 73 | 4:1 | 2.5 | 1.6 | 32 | 0.89 | 3.9 | 6.7 | 17.0 |
| 74 | 4:1 | 4.0 | 1 | 24.2 | 0.90 | 5.4 | 14.84 | 15.8 |
| 75 | 4:1 | 6.3 | 0.63 | 13.8 | 0.94 | 7.2 | 0.82 | 17.8 |

Notes to Tables:
11. Shear response is determined as the ratio of melt flow to the equivalent melt flow derived by using a 9.03 kilogram weight and following the same procedure as for melt flow.

I claim:
1. A process for the polymerization of propylene or a mixture comprising propylene and one or more alpha-olefins and, optionally, one or more diolefins comprising contacting the propylene or the mixture of olefins in at least one reaction zone, under polymerization conditions, with a catalyst system comprising (i) a solid catalyst precursor,

$TiCl_4 \cdot 12MgCl_2 \cdot 2C_6H_5COOC_6H_5$ (ii) a hydrocarbylaluminum cocatalyst; and (iii) a mixture of selectivity control agents comprising a mono- or polycarboxylic acid ester and a silicon compound containing at least one silicon-oxygen-carbon linkage
with the proviso that (a) the atomic ratio of aluminum to titanium is in the range of about 5 to about 300; and (b) the molar ratio of the ester to silicon compound in the mixture of selectivity control agents is at least about 1.5:1.

2. The process defined in claim 1 wherein the process is carried out in the gas phase.

3. The process defined in claim 1 wherein the molar ratio of aluminum to titanium is in the range of about 10 to about 200.

4. The process defined in claim 1 wherein the molar ratio of ester to silicon compound in the mixture of selectivity control agents is in the range of about 1.5:1 to about 50:1.

5. The process defined in claim 4 wherein the molar ratio of ester to silicon compound in the mixture of selectivity control agents is in the range of 2:1 to about 20:1.

6. The process defined in claim 2 wherein the process is carried out continuously in a fluidized bed.

7. The process defined in claim 1 wherein the cocatalyst is a trialkyl aluminum.

8. The process defined in claim 1 wherein a modifier having the following formula is introduced:

$BX_3$ or $AlR_{(3-a)}X_a$ wherein X is chlorine, bromine or iodine;
R is an alkyl radical having 1 to 14 carbon atoms;
each X and R are the same or different; and
a is 0, 1, or 2.

9. The process defined in claim 1 wherein the mixture of selectivity control agents comprises para-ethoxyethyl benzoate and a dialkyldialkoxysilane or an alkyltrialkoxysilane.

10. The process defined in claim 9 wherein the silane is diisobutyldimethoxysilane.

11. The process defined in claim 9 wherein the silane is n-propyltrimethoxysilane.

* * * * *